Dec. 8, 1959  L. W. VERNON  2,916,444
METHOD FOR MAINTAINING CATALYTIC ACTIVITY
Filed Feb. 10, 1958
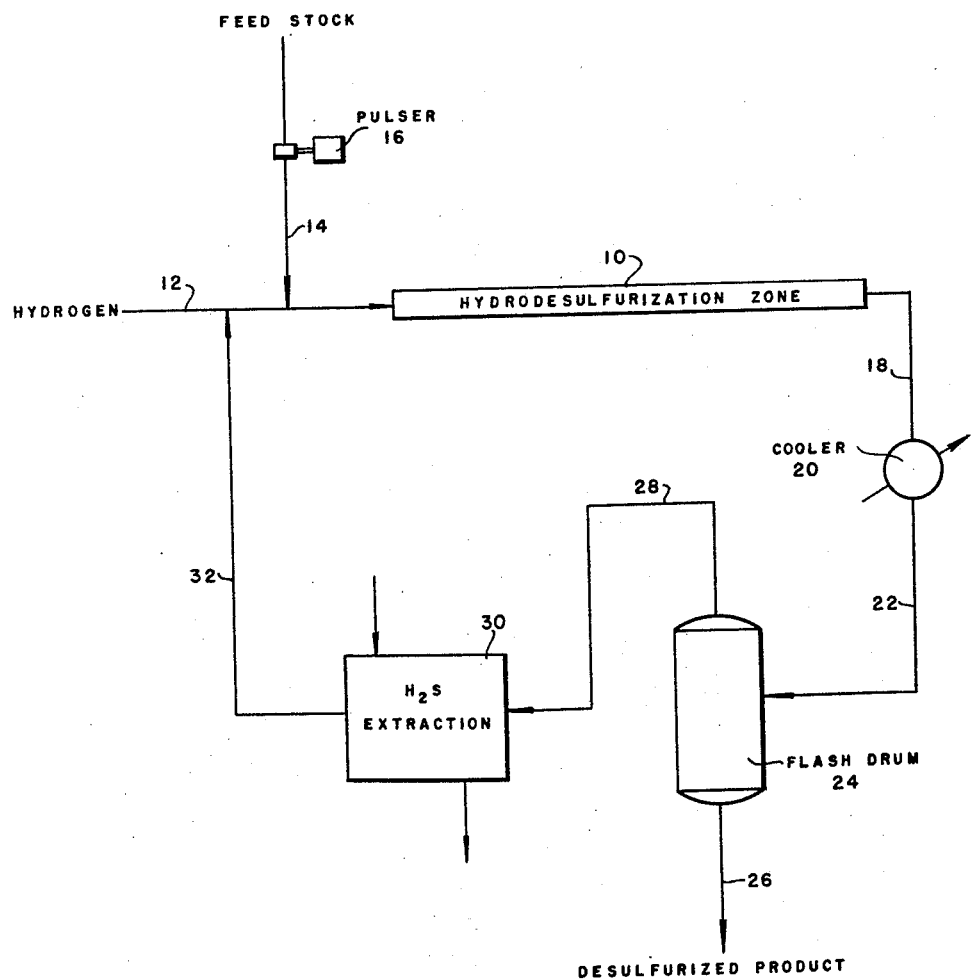
INVENTOR.
LONNIE W. VERNON,
BY
ATTORNEY.

ported on a high surface area microporous support such as gamma alumina.

Hydrogen from any suitable source (not shown) is continuously introduced into the hydrodesulfurization zone 10 by way of a charge line 12 so that hydrogen is in continual contact with all increments of the catalysts in the hydrodesulfurization zone.

A sulfur-containing hydrocarbon feed stock such as a naphtha fraction, gas oil fraction, etc. is periodically introduced into charge line 12 by way of a feed stock line 14 controlled by a pulser mechanism 16 of any suitable construction. For example, the pulser mechanism 16 may be a timed electrically actuatable valve operated so as to introduce pulses or "bursts" of feed stock at periodic intervals.

As is more clearly disclosed and claimed in copending Dinwiddie application Ser. No. 714,097, filed of an even date herewith and entitled "Catalytic Process," the introduction of a feed stock in pulses or bursts in this fashion provides for a continuous separation within the conversion zone so as to maintain a constantly changing equilibrium.

Thus, hydrogen sulfide evolved during a desulfurization reaction is continuously separated from the conversion products. However, since hydrogen is present in all incremental portions of the desulfurization zone and since hydrogen sulfide concentrations occur only in bands, it will be apparent that any metal sulfides formed by reaction of the hydrogen sulfide with the catalytic metal component will be continuously reduced by the hydrogen present in the conversion zone whereby the catalyst will be maintained in a highly active unsulfided condition.

The hydrodesulfurization products are discharged from the zone 10 by way of a line 18 leading to a cooler 20 wherein condensable hydrocarbon components are liquefied. The resultant mixture of liquids and gases is charged by way of a line 22 leading from the cooler 20 to a suitable separation means such as a flash drum 24 wherein the liquefied and gaseous components are separated. Thus, desulfurized hydrocarbon components are discharged from the flash drum 24 by way of a line 26 and gaseous products are discharged overhead by way of a line 28. In the event that it is desired to recycle unreacted hydrogen, the gaseous effluent may be charged to a suitable hydrogen sulfide extraction unit 30 wherein the hydrogen sulfide may be removed by treating the gaseous components with a suitable agent such as diethanol amine, an aqueous solution of sodium hydroxide, etc. The hydrogen sulfide-free hydrogen-containing effluent from the extraction unit 30 may be recycled to the hydrogen charge line 12 by way of a recycle line 32.

As a specific example of the process of the present invention, a zone 10 may be provided having a length-to-diameter ratio of about 10. The reaction zone may be packed with a catalyst consisting of about 10–40 weight percent of metallic nickel supported on activated (i.e., finely divided, microporous) gamma alumina. Hydrogen may be continuously passed through the zone 10 at a gaseous flow rate of about 100 cubic feet per hour per cubic foot of catalyst. A petroleum hydrocarbon gas oil fraction boiling within the range of about 375° to 700° F. and containing about 2 weight percent of sulfur may be periodically introduced into the hydrodesulfurization zone 10 in pulses, each period of injection of feed stock lasting for about 5 seconds and each period between feed injections lasting for about 1–2 seconds, giving a liquid feed rate of approximately 1 v./v./hr.

Hydrodesulfurization conditions to be maintained within the conversion zone by any suitable means such as preheating of the feed and hydrogen, etc. may include a temperature within the range of about 600° to 750° F.

United States Patent Office 2,916,444
Patented Dec. 8, 1959

2,916,444
METHOD FOR MAINTAINING CATALYTIC ACTIVITY

Lonnie W. Vernon, Baytown, Tex., assignor, by mesne assignments, to Esso Research and Engineering Company, Elizabeth, N.J., a corporation of Delaware Application February 10, 1958, Serial No. 714,335

6 Claims. (Cl. 208—217)

This invention relates to a method for maintaining the catalytic activity of a solid metal-containing contacting agent in a catalytic conversion process. More particularly, this invention relates to a method for sustaining the catalytic activity of a solid oxidizable metal-containing contacting agent employed in a conversion operation characterized by the incidental production of oxidizing materials.

Many of the metal-containing contacting agents that are potentially useful in promoting catalytic conversion operations have found only limited utility with respect to conversion operations that are characterized by the incidental production of de-electronating (i.e., oxidizing) agents which, on reaction with the metal, will substantially inhibit the activity thereof. As an example, it is recognized that metals such as nickel, molybdenum, iron, etc. have excellent catalytic activity with respect to the hydrodesulfurization of petroleum hydrocarbon feed stocks. However, it has not heretofore been practical to utilize such metals as catalysts for desulfurization reactions in that the hydrogen sulfide that is formed during the course of the desulfurization reaction readily reacts with such catalysts to form sulfides thereof, such sulfides having an unsatisfactory catalytic activity. As a consequence, it has been the practice to use sulfur insensitive catalysts such as oxides or sulfides of such metals even though the activity of these compounds is normally less than the catalytic activity of the metals.

In accordance with the present invention, metal catalyzed conversion operations are conducted without impairing the activity of the catalyst by continuously flowing a fluent electronating (i.e., reducing) agent through a conversion zone containing a bed of finely divided, preferably microporous, catalyst and by periodically introducing pulses of a feed stock, such as a sulfur-containing hydrocarbon fraction, into such conversion zone at timed intervals such that the more slowly moving components of a pulse are not substantially comingled with faster moving components of the next following pulse; whereby the action of oxidizing agents such as hydrogen sulfide evolved during the course of the reaction is effectively counteracted.

The process of the present invention may be conducted in vapor phase employing a vaporized electronating agent and a vaporized feed stock or may be conducted in liquid phase with liquid electronating agents and liquid feed stocks.

The invention will be further illustrated by the accompanying drawing which is a schematic flow sheet illustrating, by way of example, the manner in which a hydrodesulfurization reaction may be practiced in accordance with the present invention.

Turning now to the drawing, there is provided a hydrodesulfurization zone 10, which, if desired, may have a comparatively high length-to-diameter ratio. Disposed within the hydrodesulfurization zone 10 is a bed of a metallic hydrodesulfurization catalyst such as metallic nickel, molybdenum, iron, vanadium, etc. preferably supand a pressure within the range of about 200 to 600 p.s.i.g.

When the feed stock is treated under such conditions, enhanced desulfurization is obtained due to the high desulfurization activity of the nickel catalyst and due to the continual maintenance of the catalyst in an unsulfided condition.

As another example, the zone 10 may be filled with a finely divided dehydrogenation catalyst (e.g., 77 percent $Fe_2O_3$, 20 percent $K_2CO_3$ and 3 percent $Cr_2O_3$). A gas consisting essentially of carbon dioxide and heated to a temperature of about 650° to 800° F. (e.g., 750° F.) may be continuously passed through the zone 10 at a gaseous flow rate of about 100 cubic feet per hour per cubic foot of catalyst. Pulses of a preheated butylenes feed stock are then periodically injected into the flowing stream of carbon dioxide; each pulse lasting about 5 seconds and the period between pulses lasting about 1 to 2 seconds. Under such conditions, there is obtained a conversion of about 40 to 45 percent of the butylenes to butadiene. Moreover, the tendency of the catalyst to become rapidly deactivated is largely overcome in that the carbon dioxide will minimize hydrogen adsorption by the catalyst and will provide an oxidizing atmosphere which will substantially inhibit reduction of the catalyst.

What is claimed is:

1. In a method for treating a fluent organic feed stock in a bed of finely divided metal-containing catalyst wherein a de-electronating agent reactive with metal components of the catalyst is liberated, the improved method for inhibiting de-electronation of the catalyst which comprises the steps of continuously passing a stream of a fluent electronating agent through said bed of catalyst and periodically introducing pulses of said feed stock into said stream of electronating agent, the period of time between pulses being sufficient to prevent mixing of components of each pulse with components of the next following pulse.

2. In a method for the vapor phase hydrodesulfurization of a fluent petroleum hydrocarbon feed stock under hydrodesulfurization conditions in a conversion zone containing a finely divided gamma-alumina supported metal desulfurization catalyst, the improved method for inhibiting sulfiding of said metal which comprises the steps of continuously passing a stream of hydrogen through said conversion zone, periodically introducing pulses of vaporized feed stock into said stream of hydrogen, and continuously recovering a desulfurized product from the effluent from said conversion zone, the period of time between pulses being sufficient to prevent mixing of reaction components of each pulse with hydrogen sulfide evolved from a succeeding pulse.

3. A method as in claim 2 wherein the metal is nickel.

4. A method as in claim 2 wherein the effluent is treated for the recovery of hydrogen sulfide-free hydrogen and wherein said hydrogen is recycled.

5. A method for the hydrodesulfurization of a sulfur-containing petroleum hydrocarbon gas oil feed stock which comprises the steps of continually flowing hydrogen through an elongate reaction zone having a length-to-diameter ratio of about 10 and containing finely divided nickel supported on gamma alumina at a flow rate of about 100 cubic feet of hydrogen per hour per cubic foot of catalyst under conditions including a temperature within the range of about 600° to about 750° F. and a pressure within the range of about 200 to 600 p.s.i.g., periodically introducing pulses of said feed stock into said continually flowing stream of hydrogen, the period of each injection of feed stock lasting for about 5 seconds and each period between pulses of said injection lasting from about 1 to 2 seconds to thereby provide a liquid feed rate of about 1 v./v./hr., and recovering a desulfurized gas oil product from the reactor effluent.

6. A method for the dehydrogenation of a butylenes feed stock in a reaction zone having a length-to-diameter ratio of about 10 and containing a dehydrogenation catalyst consisting of about 77 percent $Fe_2O_3$, about 20 percent $K_2CO_3$, and about 3 percent $Cr_2O_3$, said method comprising the steps of continually flowing carbon dioxide heated to a temperature within the range of about 650° to 800° F. through said reaction zone at a flow rate of about 100 cubic feet of heated carbon dioxide per hour per cubic foot of catalyst, periodically introducing pulses of said butylenes feed stock into said flowing stream of carbon dioxide and recovering butadiene from the effluent from said reaction zone, the period of injection of each of said pulses of feed stock lasting about 5 seconds and the period of time between pulses lasting from about 1 to 2 seconds.

References Cited in the file of this patent

UNITED STATES PATENTS 2,623,006    McAfee _____ Dec. 23, 1952